US009525313B2

(12) United States Patent
Foulsham et al.

(10) Patent No.: US 9,525,313 B2
(45) Date of Patent: Dec. 20, 2016

(54) COIL TOOTH ASSEMBLY

(75) Inventors: John P. Foulsham, Farnham (GB);
Rupert Paul Kirby, Farnham (GB)

(73) Assignee: PROTEAN ELECTRIC LIMITED (GB)

( * ) Notice: Subject to any disclaimer, the term of this patent is extended or adjusted under 35 U.S.C. 154(b) by 1009 days.

(21) Appl. No.: 13/638,388

(22) PCT Filed: Nov. 26, 2010

(86) PCT No.: PCT/GB2010/002185
§ 371 (c)(1),
(2), (4) Date: Apr. 26, 2013

(87) PCT Pub. No.: WO2011/064550
PCT Pub. Date: Jun. 3, 2011

(65) Prior Publication Data
US 2013/0200746 A1 Aug. 8, 2013

(30) Foreign Application Priority Data

Nov. 27, 2009 (GB) .................................. 0920880.2

(51) Int. Cl.
*H02K 1/14* (2006.01)
*H02K 1/18* (2006.01)
(Continued)

(52) U.S. Cl.
CPC ................ *H02K 1/18* (2013.01); *H02K 1/148* (2013.01); *H02K 1/16* (2013.01); *H02K 1/24* (2013.01);
(Continued)

(58) Field of Classification Search
CPC ............ H02K 1/12; H02K 1/148; H02K 1/18; H02K 1/16; H02K 1/24; H02K 1/28; H02K 15/06; H02K 15/12; H02K 17/02; H02K 29/03
(Continued)

(56) References Cited

U.S. PATENT DOCUMENTS 5,583,387 A * 12/1996 Takeuchi ................. H02K 1/16
174/DIG. 20
5,801,473 A * 9/1998 Helwig ..................... H02K 1/12
310/114
(Continued)

FOREIGN PATENT DOCUMENTS

DE      3240580 A1      5/1984
DE      10106717 A1     8/2002
(Continued)

OTHER PUBLICATIONS

"PCT International Search Report dated Apr. 12, 2012 for PCT/GB2010/002185, from which the instant application is based," 4 pgs.
(Continued)

*Primary Examiner* — Tran Nguyen
(74) *Attorney, Agent, or Firm* — The Mason Group Patent Specialists, LLC; Valerie M. Davis (57) ABSTRACT

A stator back-iron or rotor back-iron of an electric motor, for receiving coil windings comprises a support (2) with a plurality of teeth (3) radially distributed about the support. The teeth are arranged to receive wire windings and are integrally formed with the support. The teeth and support are formed of laminations. The support further comprises a plurality of engagement means (5) formed between the teeth arranged to receive additional teeth (6) having wire windings mounted thereon. Preferably the engagement means are provided between adjacent teeth. The support and integral
(Continued)

teeth provide a rigid structure while the spacing provided by using additional teeth makes it easier to wind coils.

19 Claims, 9 Drawing Sheets

(51) Int. Cl.
    *H02K 1/24*           (2006.01)
    *H02K 1/16*           (2006.01)
    *H02K 15/06*         (2006.01)

(52) U.S. Cl.
    CPC .......... *H02K 15/06* (2013.01); *Y10T 29/49009* (2015.01); *Y10T 29/49012* (2015.01)

(58) Field of Classification Search
    USPC .... 310/216.016, 216.019, 216.071, 216.073, 310/216.079, 216.086
    See application file for complete search history.

(56) References Cited

U.S. PATENT DOCUMENTS

| | | | | |
|---|---|---|---|---|
| 5,982,070 | A * | 11/1999 | Caamano | H02K 1/02 29/596 |
| 6,157,109 | A * | 12/2000 | Schiferl | H02K 1/16 310/216.019 |
| 6,222,296 | B1 * | 4/2001 | Sakai | H02K 1/16 310/216.019 |
| 6,346,755 | B1 * | 2/2002 | Tong | H02K 9/10 310/216.111 |
| 6,369,687 | B1 * | 4/2002 | Akita | H02K 1/148 310/216.011 |
| 6,584,813 | B2 * | 7/2003 | Peachee | D06F 7/304 68/23.6 |
| 6,646,535 | B2 * | 11/2003 | Miyake | H02K 15/022 310/216.074 |
| 6,700,284 | B2 * | 3/2004 | Williams | F04D 25/08 310/216.075 |
| 6,809,453 | B2 * | 10/2004 | Narita | H02K 17/02 310/216.008 |
| 6,977,456 | B2 * | 12/2005 | Yamamoto | H02K 1/148 310/216.012 |
| 6,992,418 | B2 * | 1/2006 | Hans | H02K 1/146 310/216.091 |
| 7,002,280 | B2 * | 2/2006 | Endo | H02K 1/145 310/216.008 |
| 7,003,867 | B2 * | 2/2006 | Yamamoto | H02K 1/24 242/361.1 |
| 7,019,433 | B2 * | 3/2006 | Hashimoto | H02K 29/03 310/402 |
| 7,095,153 | B1 * | 8/2006 | Shoykhet | H02K 55/04 310/254.1 |
| 7,135,800 | B2 * | 11/2006 | Yamada | H02K 29/03 310/216.028 |
| 7,800,272 | B2 * | 9/2010 | Nakayama | H02K 1/2766 310/156.56 |
| 2004/0113511 | A1 * | 6/2004 | Schmidt | H02K 1/24 310/216.061 |
| 2004/0164639 | A1 | 8/2004 | Yamamoto et al. | |
| 2004/0189137 | A1 | 9/2004 | Hashimoto et al. | |
| 2005/0073213 | A1 * | 4/2005 | Naito | H02K 1/148 310/154.05 |
| 2005/0168099 | A1 | 8/2005 | Yamamoto et al. | |
| 2007/0252447 | A1 * | 11/2007 | Ionel | H02K 1/148 310/44 |
| 2010/0001612 | A1 * | 1/2010 | Nagai et al. | 310/216.043 |

FOREIGN PATENT DOCUMENTS

| | | |
|---|---|---|
| DE | 102007032872 A1 | 1/2009 |
| GB | 2220681 A | 1/1990 |
| WO | 02058210 A1 | 7/2002 |
| WO | 2004098023 A1 | 11/2004 |
| WO | WO 2008139531 A1 * | 11/2008 |
| WO | 2011064550 A2 | 6/2011 |

OTHER PUBLICATIONS

European Patent Office; Written Opinion of the ISR; May 27, 2012; World Intellectual Property Organization; Rijswijk.
Intellectual Property Office; Combined Search and Exam Report; Feb. 1, 2010; Intellectual Property Office; United Kingdom.
Intellectual Property Office; Exam Report Standard; Jul. 19, 2012; Intellectual Property Office; United Kingdom.
Intellectual Property Office; Search Report First; Jan. 1, 2010; Intellectual Property Office; United Kingdom.

* cited by examiner

COIL TOOTH ASSEMBLY

RELATED APPLICATIONS

This application is a 35 U.S.C. 371 national stage filing from International Application No. PCT/GB2010/002185 filed Nov. 26, 2010, which claims priority to British Application No. 0920880.2 filed Nov. 27, 2009, the teachings of each of which are incorporated herein by reference.

FIELD OF THE INVENTION

This invention relates to coil tooth assemblies for use in stators and/or rotors, particularly stators or rotors for electric motors, and their construction.

BACKGROUND OF THE INVENTION

Stators are well known as the stationary part of an electric motor or electric generator about which a rotor turns. Stators generally comprise a magnetic component and other structural components. Electric motors work on the principle that a current carrying wire will experience a force in the presence of a magnetic field. Typically a rotor, carrying a set of permanent magnets, would be arranged to rotate about a set of coils arranged to carry an electric current, resulting in the rotor rotating about the stator and generating movement. It will be appreciated that it is also possible for the rotor to carry a set of coils and the stator to carry a set of permanent magnets.

Figure 1:
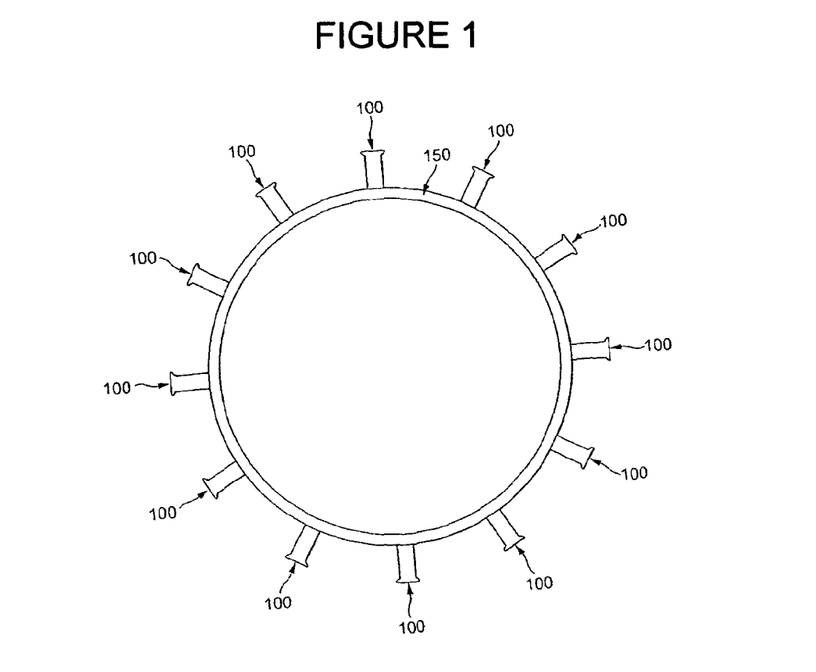
FIG. 1 is a prior art example of a stator element formed as a single piece with integral teeth.

It is known to produce back-irons for stators such as those shown in FIG. 1. FIG. 1 shows the back-iron of a stator formed of a single piece of material, or more commonly built up of a number of identical laminations. The protrusions 100 from the circular support 150 (also known as a back iron) are known as "teeth" and are used to receive a plurality of coil windings in order to increase the number of turns of coils on the stator and therefore to increase the rate of flux cut. In order to avoid the phenomenon known as "cogging" or "torque ripple", which are know to cause jerkiness in electric motors, it is necessary to use a large number of teeth. It is also desirable to provide, on each tooth, the highest number of coil windings possible. However, with an arrangement such as FIG. 1, where the entire stator is formed of a single solid piece, it will be appreciated that there is a limited amount of space to physically wind the wire coils about the teeth (FIG. 1 being schematic and therefore exaggerating the distance between adjacent teeth). Therefore, it is common in such arrangements for there to be gaps between the coils of adjacent teeth, which is inefficient since this space could otherwise be filled with wire coils to increase the rate of flux cut by the stator coils.

Figure 2:
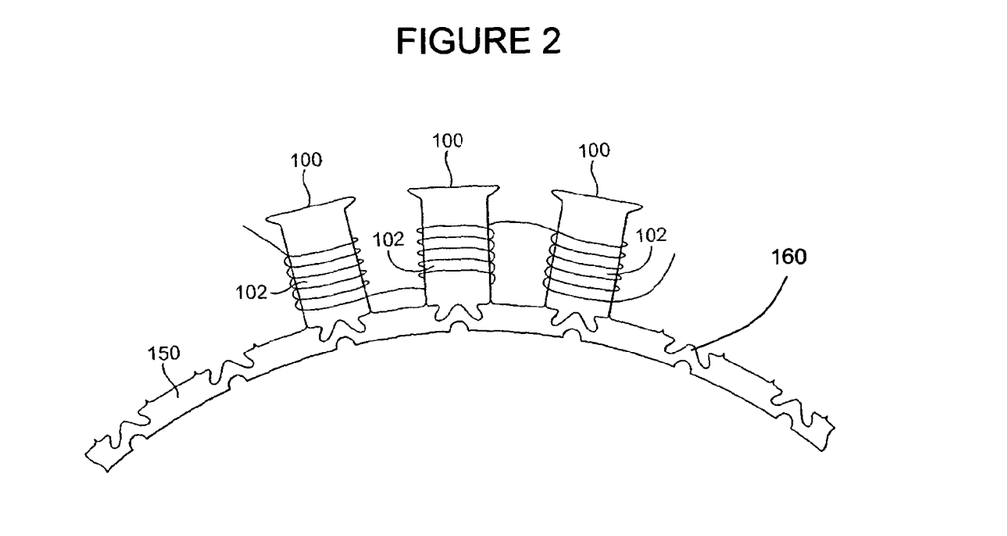
FIG. 2 is a known stator arrangement in which the individual teeth are all separate to the stator back iron and engaged therewith by interference fit.

A known solution to this problem is to have a back-iron support having a plurality of slots arranged to receive separate individual teeth. FIG. 2 shows such an example. In this manner, the teeth 100 can be individually wound, using purpose built machinery, for simply being slotted around the stator support 150. This allows for a higher density of coils on each tooth avoiding the problem of wasted space with the example of FIG. 1.

However, the arrangement of FIG. 2 is not without its problems. Long term structural problems arise because all the teeth are not physically part of the stator support. Typically they engage with the stator by slots 160 and are therefore not firmly attached, using an interference type-fit. Due to the temperature changes experienced in electric motors during their operational lifetime the stator undergoes a great number of expansion and contraction cycles which can cause the interference fit to fail. Also, the stator is typically exposed to vibrations causing further breakdown of the interference fit. It is possible to use glue or pins, for example, to keep the teeth in place, but all fixing means eventually break down due to the problems listed above.

SUMMARY OF THE INVENTION

The invention is defined in claim 1, to which reference is now directed, with preferred advantageous features being set out in the dependent claims.

Embodiments of the invention provide an element of an electric motor or generator, such as a stator back-iron or rotor back-iron, for receiving coil windings, in which the advantages of the ease of winding and structural strength and rigidity are combined. A first aspect of the invention provides a coil teeth assembly for an electric motor comprising a support, or back iron, with a plurality of teeth radially distributed about the support. The teeth are arranged to receive wire windings and are integrally formed with the support, preferably with the teeth and the support being manufactured as a single structural component. The support, and integral teeth, may be formed of laminations. The support further comprises a plurality of engagement means formed between the teeth and each arranged to receive an additional tooth having wire windings mounted thereon. Preferably the engagement means are provided between adjacent teeth. The engagement means may be arranged to restrict radial and circumferential movement of the additional tooth relative to the support.

The coil teeth assembly may be arranged to receive a plurality of individual teeth that may be attached around the assembly. Alternatively the coil teeth assembly may be arranged to receive a corresponding and complimentary coil teeth assembly, also having integral teeth around a support or back iron, which engages with the first coil teeth assembly and is used to form a complete electric motor element such as a complete stator back-iron or rotor back-iron. A method of constructing an electric motor element is also provided in which the teeth of the coil teeth assembly are wound with wire for being engaged with a complimentary coil teeth assembly or a plurality of additional teeth as described above and below.

Such an electric motor element can therefore have both a high density of coil windings around each tooth, due to the additional space provided by the gaps between the teeth, but also improved structural rigidity and robustness over the prior art electric motor elements that use entirely separate teeth.

Figure 9:
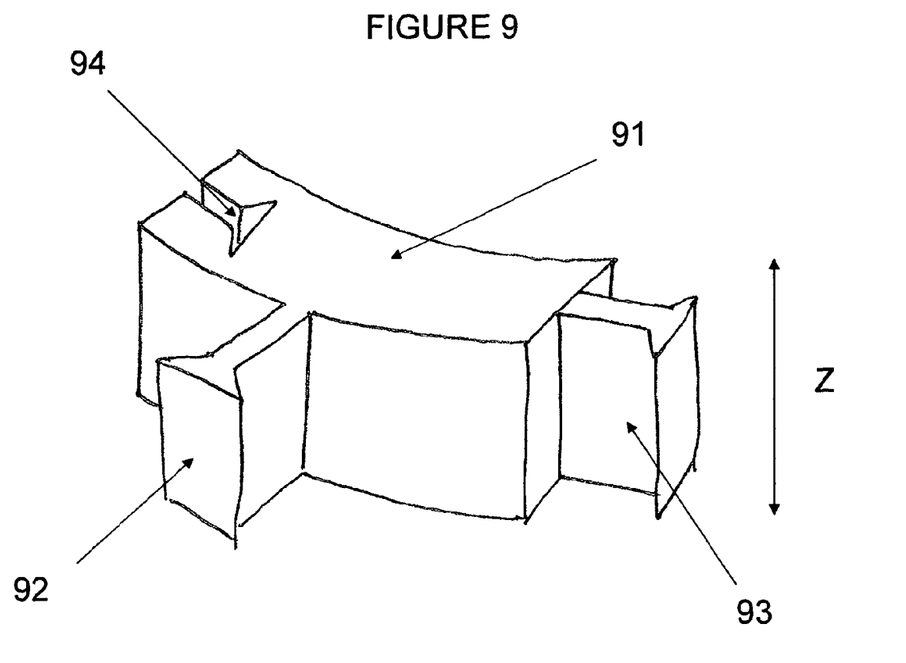
FIG. 9 shows a support member used to make a coil tooth assembly.

It is also possible for the coil tooth assemblies to be comprised of two or more support members. The support members would comprise a main body (91), at least one tooth integrally formed with the main body for receiving wire windings (92), one or more engagement means arranged to receive an additional tooth having wire windings mounted thereon, and coupling means (93/94) for coupling the support member to one or more additional support members to form a coil tooth assembly.

BRIEF DESCRIPTION OF THE DRAWINGS

Specific embodiments of the invention will now be described in detail, by way of example, with reference to the accompanying drawings in which.

DETAILED DESCRIPTION

Although embodiments of the invention will now be described in relation to a stator element for an electric motor, it should be appreciated that the invention applies equally to rotor arrangements in the instance of electric motors in which the rotor carries the wire coils. The invention also applies equally to electric generators.

Figure 3A:
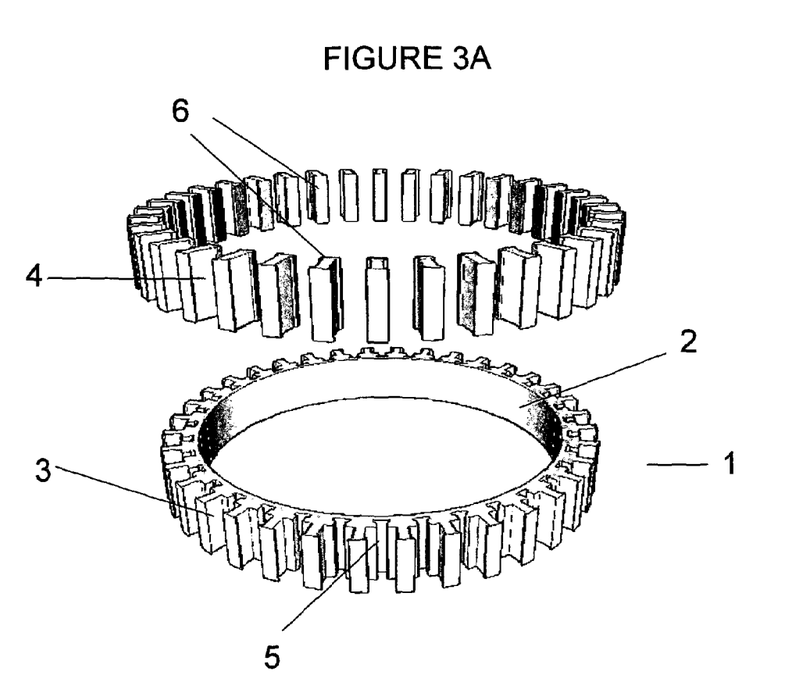
FIG. 3A shows a coil teeth assembly stator element and separate individual teeth according to an embodiment of the invention prior to fitting.
Figure 3B:
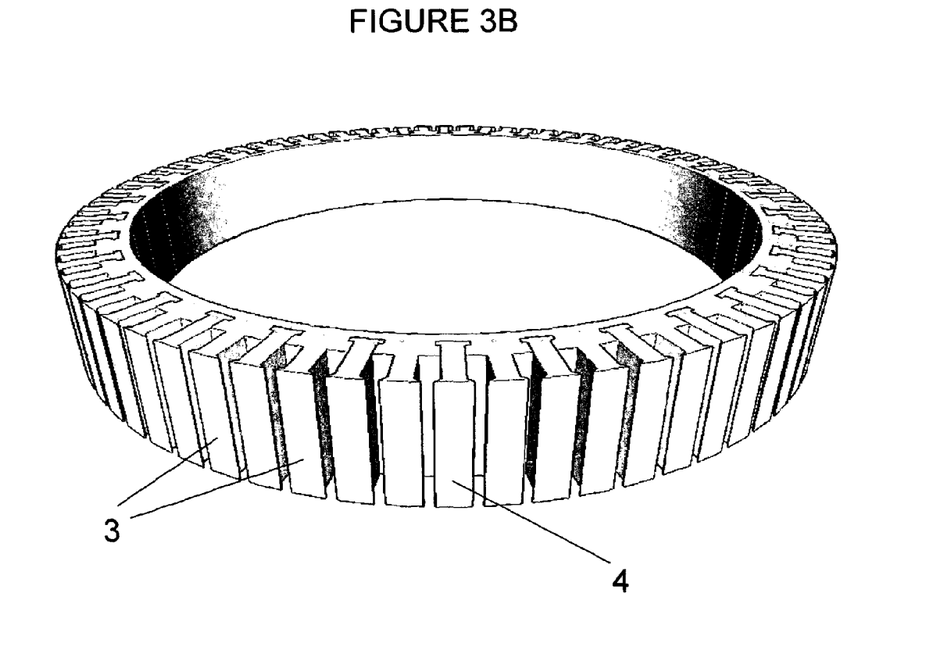
FIG. 3B shows a complete stator back-iron after fitting the parts shown in FIG. 3A together.

The first embodiment of the invention, shown in FIGS. 3A and 3B, provides an assembly for the coils of an electric motor, here a stator coil teeth assembly (1) formed of a stator support, such as a continuous ring back iron (2) and a plurality of teeth (3) arranged circumferentially about the support. The teeth (3) and the support (2) are formed as a single piece, integral, structural component, perhaps as a moulded structure. For the avoidance of doubt the term "teeth" is intended to refer to protrusions around the stator support for receiving coil windings. Other than the fact that these teeth can receive windings of coils of wire there are a variety of shapes that may have the appropriate structural and magnetic properties to function as teeth. Rather than arranging the full number of teeth around the stator support, a smaller number of teeth, and preferably half the number of teeth, may be left out of the arrangement leaving a reduced number of teeth and preferably alternate teeth in comparison to a complete stator back-iron. Although any number of teeth can be used, the number of teeth is preferably between 50 and 100. One particularly preferred number of teeth within a stator is 72, so 36 teeth could be provided around the stator support. This provides a greater amount of space between each integral tooth, improving access to each tooth and making it easier to wind the coil about it, and allowing a greater amount of space to be filled with coils. After winding the integral teeth (3), separate individual teeth (4) may be engaged with the stator support to provide a complete stator element to be combined with other structural features, such as a heat sink, to form a complete stator. Since these teeth are separate from the stator support they can be pre-wound before installation, again with the advantage that winding is easier than if the teeth were integral to the stator support.

In order to engage the individual teeth (4) with the stator element (1) there is provided engagement means (5) on the stator support and complimentary engagement means (6) on individual teeth. Preferably this is in the form of a slot in the stator support and correspondingly shaped protrusions on the individual teeth, although it will be appreciated that it is possible for the protrusion to be on the stator support and the slot or recess to be on the individual tooth. The slotting of the individual teeth into their respective slots can form an interference fit. An interference fit, also known as a press fit, is a fastening between two parts which is achieved by friction after the parts are pushed together. Of course, other means of fastening the teeth to the back-iron are possible, such as using adhesive, or a combination of adhesive and interference fit.

Figure 4:
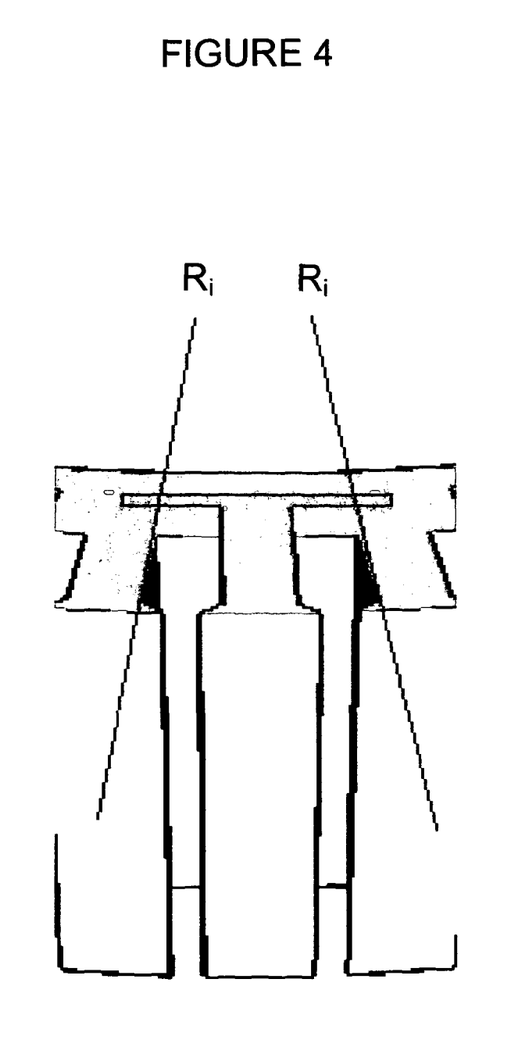
FIG. 4 shows an additional feature of the invention for mounting teeth.

It will be appreciated that an interference fit between the individual teeth and the stator support will suffer from the same problems as described from the prior art in that the interference fit may become distorted and ineffective over time. A further advantage of the current invention is that the slot into which the individual teeth are placed can be extended in comparison to the prior art in which each stator tooth is individually mounted. The hole can be shaped to extend underneath the integrated teeth as shown in FIG. 4. It can be seen from the Figure that the recess into which the separate teeth are slotted can extend circumferentially around the stator support and pass across the nearest radial line ($R_t$) defined by the adjacent integral stator teeth and the centre of the stator—i.e. past the circumferential position of the adjacent integral stator teeth. In this way the interference fit between the individual teeth and the stator support is improved due to the greater amount of contact surface area providing a better anchoring force. This feature can be implemented in all other embodiments of the invention.

It is possible to manufacture the stator support out of standard materials used for stators as are well known in the art. The changing magnetic fields experienced by the stator induce eddy currents. The energy in these currents is dissipated as heat in the electrical resistance of the conductor resulting in energy loss. Eddy currents also have their own magnetic field associated with them, which opposes the magnetic field of the permanent magnets. To reduce eddy currents the stator support may be comprised of stacks of thin sheets, or laminations, of material. In particular, sheets of steel, and specifically electrical steel, are used although any material with the appropriate strength and rigidity and magnetic reluctance would be appropriate. These sheets may also have an insulating coating on the surface to prevent eddy currents from flowing between the sheets.

Preferably the stator coil teeth assembly could be produced as a series of laminations stacked to the desired thickness. The laminations could be produced by stamping or cutting the desired shape from a sheet of the required material. The resulting assembly is a single piece, integral component, with the teeth being formed with the support/back iron. As an example, the laminations may have a thickness of between 0.3 and 0.4 mm and preferably around 0.35 mm.

The individual teeth may also be comprised of a series of laminations, as described above for the stator support, to ensure a continuous magnetic field is established between the support and the individual teeth. However, in a preferred embodiment, the individual teeth may be made from a soft magnetic composite (SMC) rather than laminations. SMCs have good magnetic properties, such as good relative permeability and magnetic saturation, but with high electrical resistivity which reduces energy loss due to eddy currents. Unlike conventional laminated materials, SMCs have 3D isotropic thermal and magnetic properties, including electrical resistance. SMCs typically comprise high purity iron powder, in which the particles are insulated from each other using different insulators/dielectrics, which keeps eddy current core loss confined to individual particles resulting in lower loses than laminated steels. Additionally advantageously, SMCs can be made into complex shapes while maintaining good dimensional tolerances. Shapes can be formed by pressing, for example, making the construction of a stator using a combination of laminated support with individual teeth of SMC even easier than manufacturing the individual teeth from laminations.

Figure 5A:
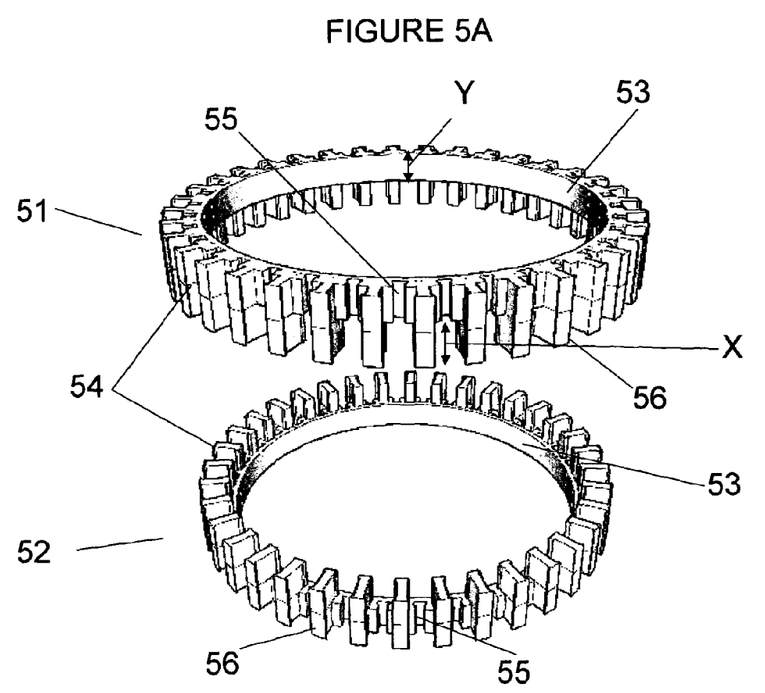
FIG. 5A shows two stator elements in accordance with a second embodiment of the invention prior to being fitted together.
Figure 5B:
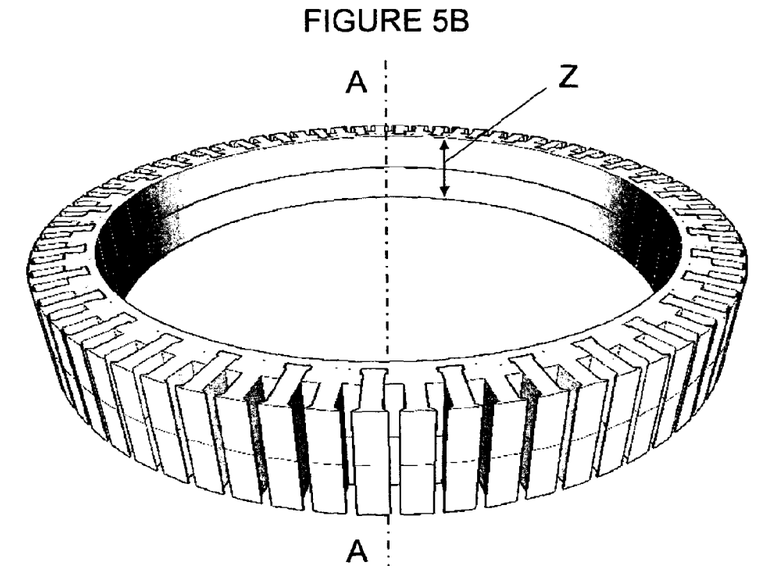
FIG. 5B shows a complete stator back-iron after fitting the parts shown in FIG. 5A together.

A second embodiment of the invention is shown in FIGS. 5A and 5B in which the stator element is completed by attaching together two complimentary coil teeth assemblies (51/52). The coil teeth assemblies comprise a support (53) or back-iron which is integrally formed with a plurality of teeth (54). As with the previous embodiment the teeth are radially distributed about the support and preferably half the number as required for a complete stator element are included, preferably providing alternate teeth. Again, it is easier to wind the integral teeth since there is more space between the adjacent teeth due to their alternate placing.

After winding the integral teeth the coil teeth assembly is engaged with a second complimentary coil teeth assembly. In order to achieve this, engagement means (55/56) are provided on both the support and the integral teeth such that the teeth and stator support engage with the stator support and teeth of the complimentary coil teeth assembly. The complimentary coil teeth assembly may be a mirror image of, identical to, or substantially similar to the first coil teeth assembly. In this way a complete stator element as shown in FIG. 5B is formed. One advantage of using two identical coil teeth assemblies is ease of construction, since the same materials, tools, methods and so on can be used for both. It is possible to construct a complete stator/rotor element by using a single stamp to build up two coil teeth assemblies from a series of identical laminations. Furthermore, to form a complete stator/rotor element the two assemblies are simply connected together, resulting in structural advantages such as an even weight distribution.

This embodiment has the advantage that all teeth are integrally formed with a stator support or back iron and there is little chance that the interference fit, which extends around the entire circumference of the stator, will fail.

It can be seen from FIGS. 5A and 5B that there can be a portion of the winding teeth (x) extending parallel to the axis, A, running through the centre of the ring, perpendicular to the plane of the ring, since the stator support has a height (dimension y) less than that of the back iron of a complete one-piece stator (dimension z) such as that of FIG. 1 (and preferably half the height—i.e. y is half the value of z). This is to allow for the teeth to engage with the stator support of the complimentary stator coil teeth assembly. This means that there is a portion of each tooth that is unsupported by the stator support. During winding of the teeth it will be appreciated that when the wire passes over the unsupported portion of the tooth, and in particular at the extreme end of the unsupported portion, there will be a flexing or deforming force applied to the tooth. This may have the effect of slightly deforming or tilting the teeth relative to the stator support.

Furthermore it is necessary, to ensure a tight interference fit, to engineer the dimensions of the stator element to high precision. This can lead to difficulty in aligning and fitting together one coil teeth assembly with a complimentary coil teeth assembly. This can be further complicated in the event, as described above, that the teeth are distorted during winding.

One option to deal with this is to assemble the coil teeth assembly to fit loosely with the engagement means of the complimentary coil teeth assembly. This allows two complimentary coil teeth assemblies to be fitted together easily, but requires a third body such as a series of pins arranged around the circumference of the stator to hold these two portions together.

Figure 6A:
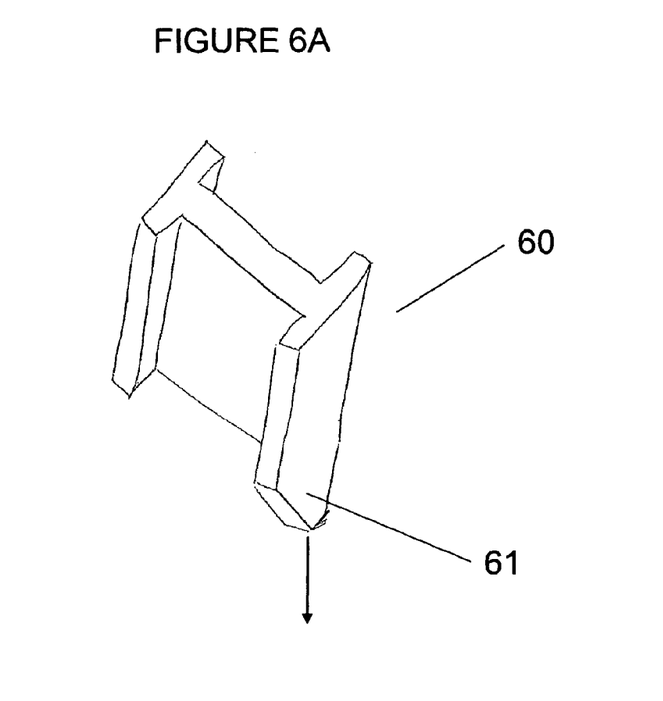
FIG. 6A shows an individual stator tooth having tapering provided thereon.

An alternative way of ensuring a tight fit, whilst allowing for easy assembly of a stator element, is to provide tapering on the portions of the teeth that engage with the engagement means on the stator support. A diagrammatic example of this can be seen in FIG. 6A for a single tooth. The tooth (60) of FIG. 6A is arranged to be inserted into the engagement means of the stator support in the direction indicated by the arrow. The tapering (61) is provided on the portion of the tooth that engages with the complimentary engagement means and allows two coil teeth assemblies to self-align provided they are aligned within the tolerances allowed for by the tapering. Having such a tapering feature makes it far easier to guide two coil teeth assemblies together to form a complete stator element (or rotor element).

Figure 6B:
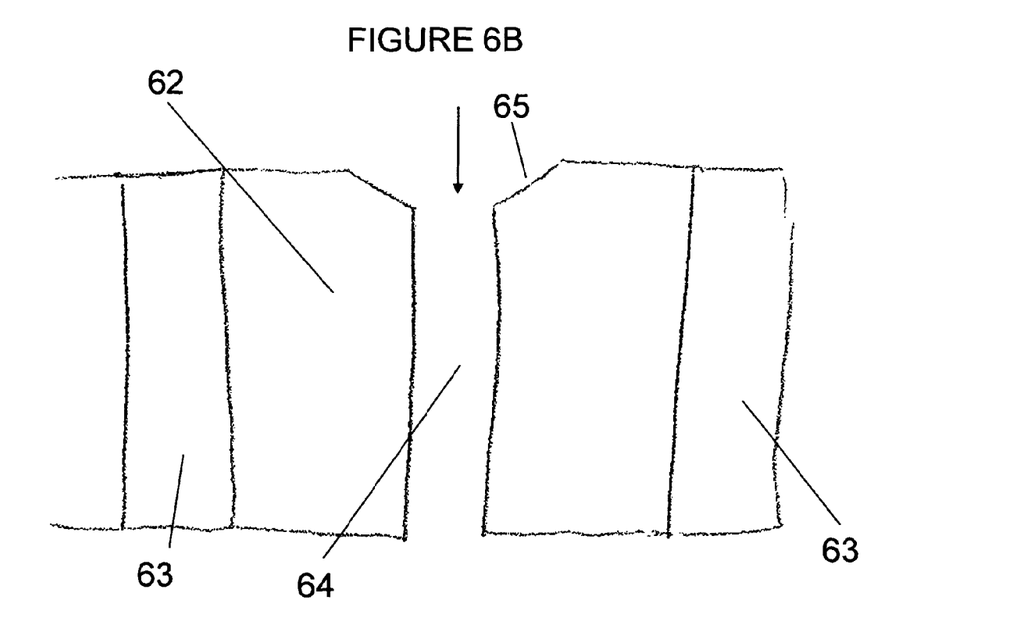
FIG. 6B shows a side view of a stator coil teeth assembly provided with tapering on the slot engagement means.

As an alternative it is also possible to have a tapering on the engagement means of the stator support, which in some embodiments will be a slot for receiving a complimentary portion of the stator teeth of a second coil teeth assembly. FIG. 6B shows an example of such tapering in a slot of the stator. Referring to the Figure, the coil teeth assembly (62) is shown from the side, with teeth (63) and a single engagement means in the form of recess or slot (64). Tapering (65) is provided on the top edges of the recess, preferably on both sides, to form a mouth to receive a corresponding tooth from the direction of the arrow. Of course, it is also possible to use both a tapering on the stator teeth or stator engagement means together. It would also be appreciated that such tapering may find utility in the first described embodiment wherein the individual teeth are tapered, or where the stator engagement means are tapered to allow easier insertion of the individual teeth.

Figure 7A:
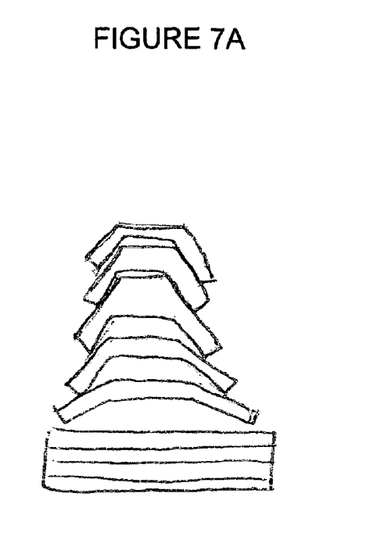
FIG. 7A shows a portion of a tooth in section indicating a possible means of engagement with a stator coil teeth assembly.
Figure 7B:
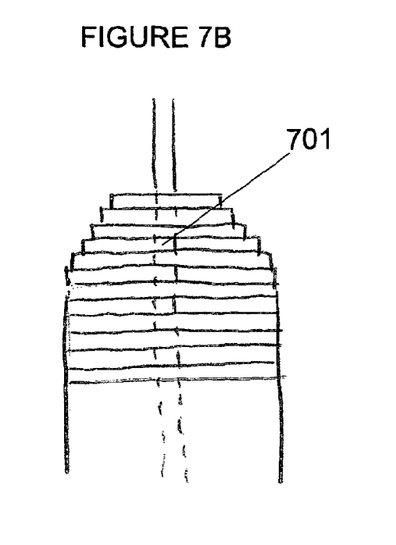
FIG. 7B shows a portion of a tooth in section indicating an alternate means of engagement with a stator coil teeth assembly.

The tapering may take many forms. FIGS. 7A and 7B show different ways of achieving a tapering effect. For example, the laminations may be made progressively smaller towards the engagement end of the teeth as shown in FIG. 7B. One way of ensuring alignment using this form of lamination would be to have a bore (701) extending through the teeth. A rod may then be inserted into the bore, over which subsequent laminations can be placed to ensure alignment and achieve an even taper. Alternatively FIG. 7A shows an example in which the overall size of the laminations can remain constant, but gradually increasing bends can be made resulting in a smoother tapering to the stepped arrangement of FIG. 7B.

Figure 8A:
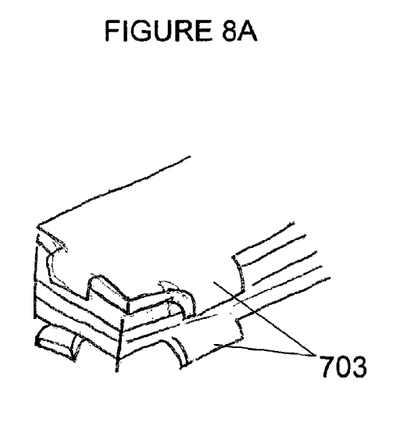
FIG. 8A shows a portion of a tooth indicating a further means of engagement with a stator coil teeth assembly.

A similar effect to the tapered examples of FIGS. 7A and 7B can be achieved using deformable tabs on the sides of the teeth which are bent away from the direction of engagement with the complimentary coil teeth assembly. FIG. 8A shows such an example. The deformable tabs (703) can be formed on one or more of the laminations and provide a smooth curving surface which helps to guide the teeth into the corresponding engagement means on the other stator support. Where SMC materials are used for individual teeth the structure can simply be formed with the desired tapering.

Figure 8B:
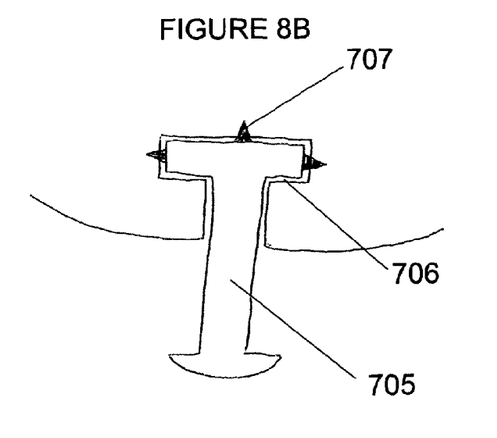
FIG. 8B shows a further alternate means of engagement between a tooth and a stator coil teeth assembly.

A further feature, applicable to any embodiment of the invention, is to include deformable protrusions on the teeth or engagement means of the stator support. FIG. 8B shows an example of such deformable protrusions, showing a possible location in relation to the teeth, but not showing how these protrusions deform. As the tooth (705) is inserted into the recess of the coil teeth assembly (706) the protrusions (707) deform. It should be noted that the clearance between the tooth and the coil teeth assembly in FIG. 8B is exaggerated to give a clearer indication of how the deformable protrusions function. The deformable protrusions help not only to guide the teeth into the engagement means but due to their deformation they also help ensure a tighter interference fit. The deformable protrusions may extend along the entire height of the stator tooth and would preferably be formed from the same material as the stator tooth. Where the stator tooth is created from a series of laminations, the protrusions could be formed from the same laminations.

Alternatively it is possible to use a specific tool arranged to accurately align and engage either the independent teeth or two complimentary coil teeth assemblies.

All embodiments of the current invention find particular utility in electric motors for motor vehicles. In particular the current invention is well suited for in-wheel electric motors in which the electric motor itself forms the support structure of a wheel.

It is known that in such electric motors a different number of phases of electric current can be used to obtain optimal driving characteristics. Three-phase motors in particular are often used. In order to achieve the required number of phases it is necessary to wind the coils in the correct direction around the stator teeth (clockwise or anti-clockwise). The winding of the coil, coupled with the direction of the electric current through the coil, determines whether the stator tooth will act as a north or south pole of a magnet. It is desirable for each alternate tooth in the stator to have an alternating polarity and one aspect to be considered is how to achieve the necessary winding for this to occur.

An advantage of the current invention is that each tooth on the stator element can be wound in the same direction and the individual teeth can be wound in the opposite direction. In the embodiment involving two complimentary coil teeth assemblies one of the assemblies can be wound in one direction and the other in the opposite direction ensuring correct winding when engaged together. Individual teeth can be wound any way it is desired. Other winding methods are possible depending upon the control circuitry used to direct current through the windings.

It will be appreciated that whilst the invention as shown in the figures and substantially as described relates to an arrangement in which the rotor surrounds a stator and rotates around it, it is fully within the scope of the current invention for the stator to surround the rotor with the winding teeth protruding radially inwards towards the centre of the stator rather than radially outwards. Furthermore, whilst the embodiments described relate to the formation of stator elements by adding teeth to a coil teeth assembly, it will be appreciated that all the features of the invention will be equally applicable to rotor elements where the coils are mounted on a coil teeth assembly used to form a rotor back-iron. Also, whilst the invention has been described in relation to stators or rotors for electric motors, the invention is equally applicable to elements of an electric generator.

Further options for the construction of the support for the teeth (i.e. a stator or rotor support/back iron) will now be discussed. One option would be to use a series of support members in the form of interlocking or coupled sections. FIG. 9 shows a single support member comprising a main body 91; at least one tooth integrally formed with the main body for receiving wire windings 92; and coupling means 93/94. In order to form a complete support, as illustrated in plan view in FIG. 10, two or more of the support members are coupled together, by the coupling means, preferably to form a circular shape having a plurality of teeth for receiving wire windings.

The coupling means 93/94 are arranged to prevent relative movement of adjacent support members when coupled together. One coupling means is formed at one end of the main body and a complimentary coupling means is formed at the other end so that coupling can be achieved at either end. FIG. 9 shows interlocking coupling means comprised of an interlocking member 93 and a recess 94. The interlocking member engages in the recess of an adjacent support member to prevent relative movement in the circumferential and radial direction of the completed support. Furthermore, by constructing the coupling means to engage by frictional force, or forming an interference type fit, relative motion perpendicular to the plane of the complete support (denoted by the axis "Z" in FIG. 9) can also be prevented. Preferably the coupling means takes the form of the interlocking members shown in FIG. 9, comprising a protrusion 93 and a recess 94. In the embodiment of FIG. 9 the interlocking members engage with complementary interlocking means on an adjacent support member by contact or interference fit. Any suitable interlocking means may be used other than, or in addition to those shown in FIGS. 9 and 10. These could include a plurality of protrusions at one end of the stator portion and a plurality of receiving recesses at the other end. Alternative coupling means could also be provided, such as retaining pins, adhesive or a combination of the two.

The support member described above has the advantage that a plurality of identical members can be connected together to form a complete support. Where a single tooth is present on each support member, winding the tooth with wire is made easier since the tooth is easily accessible. Alternatively multiple teeth can be placed on each support member. The support members will each be a particular fraction of the total circumference of the complete support. In the simplest case two support members can be used, with each one preferably being the same size and therefore occupying half the total circumference of the support. Alternatively any number of support members can be coupled together to form the complete support.

Figure 10:
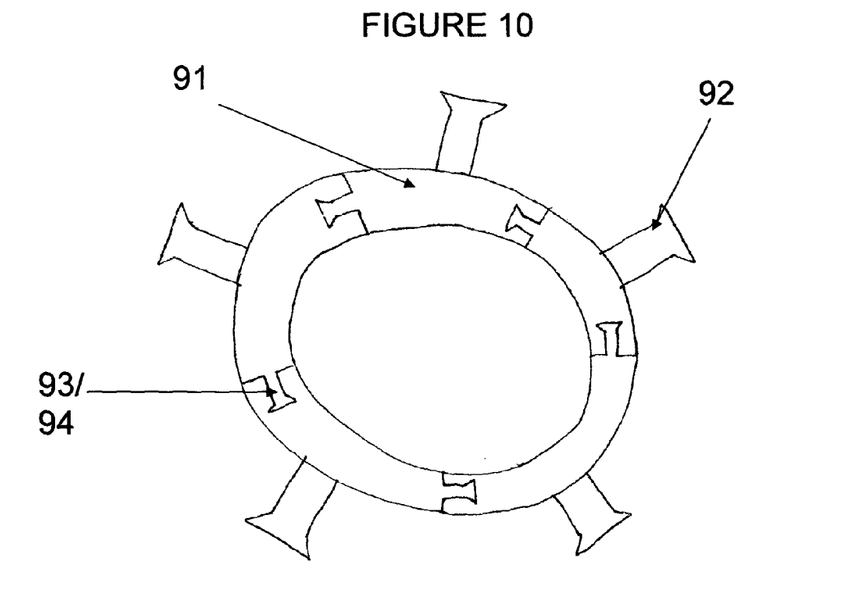
FIG. 10 shows a coil tooth assembly constructed from a number of support members such as those depicted in FIG. 9.
Figure 11:
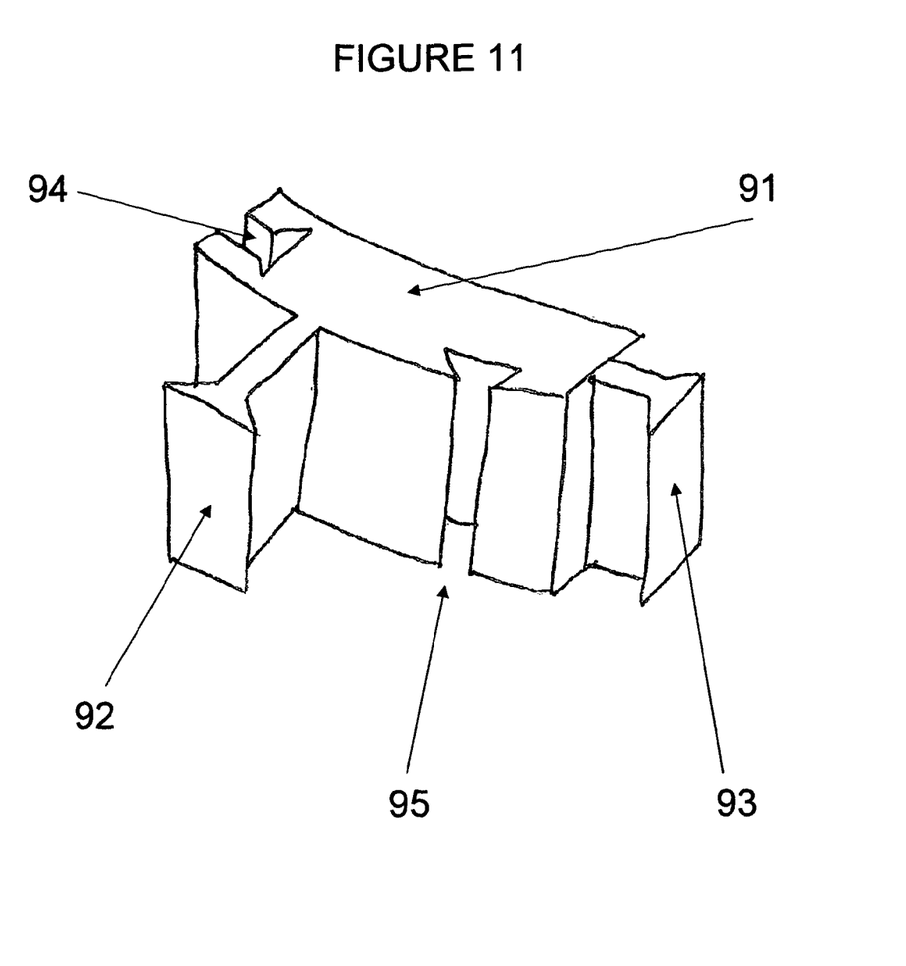
FIG. 11 shows an alternative embodiment of a support member.

FIG. 11 shows an embodiment according to the current invention in which the same references are used as with FIGS. 9 and 10 for the same parts. As well as a tooth for receiving wire windings, also included are engagement means 95 for receiving an additional tooth having wire windings mounted thereon. The engagement means 95 shares the same features as previously described for alternative embodiments, and may be replaced by any of the alternatives discussed. When a number of support members such as those shown in FIG. 11 are coupled together they form a support with a plurality of teeth circumferentially distributed about it and a plurality of engagement means formed between the teeth, each engagement means being arranged to receive an additional tooth having wire windings mounted thereon and to restrict radial and circumferential movement of the additional tooth relative to the support. In other words, a support such as that described in relation to FIGS. 3A, 3B, 5A and 5B is formed. FIG. 11 shows a single tooth 92 and a single tooth engagement means 95, but it will be appreciated that more of each could be provided. Preferably equal numbers of teeth and engagement means are used on each member such that identical members can be connected together to form a complete support having a plurality of teeth and engagement means formed between each pair of teeth. However, it should be noted that this is not a requirement, since two (or more) different support members could be used, one having a greater number of teeth than engagement means, and the other having a greater number of engagement means than teeth. For the avoidance of doubt, any number of teeth and/or engagement means are possible for each member provided that, when the support is complete, a plurality of engagement means are provided between the teeth to receive further teeth. Preferably the complete support will have unoccupied engagement means between every other tooth.

Figure 12:
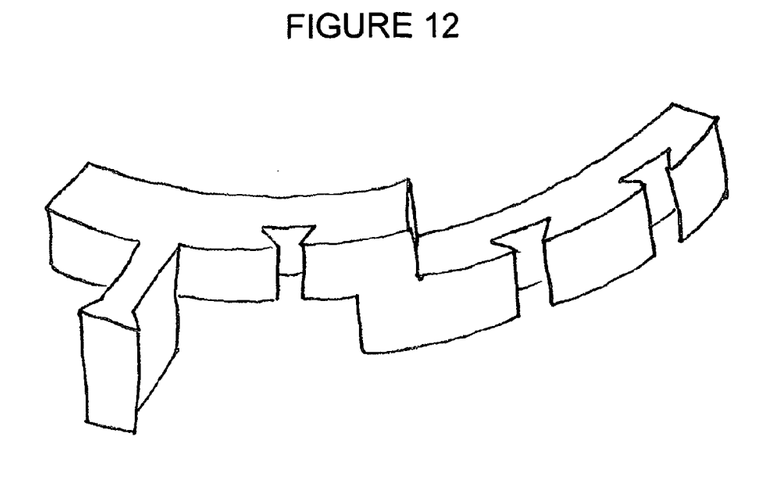
FIG. 12 shows a further embodiment of a support member.

FIG. 12 shows a further embodiment having a single integral tooth and a single engagement means on a first step of the support member, and two engagement means on a second step. Using a plurality of identical support members such as those of FIG. 12 a complete coil teeth assembly such as those described with relation to FIGS. 3A and 3B or FIGS. 5A and 5B can be made. It will be appreciated that any number of teeth and engagement means can be used provided that when the stator support is complete, a plurality of engagement means remain unoccupied between the teeth to receive further teeth.

Figure 13:
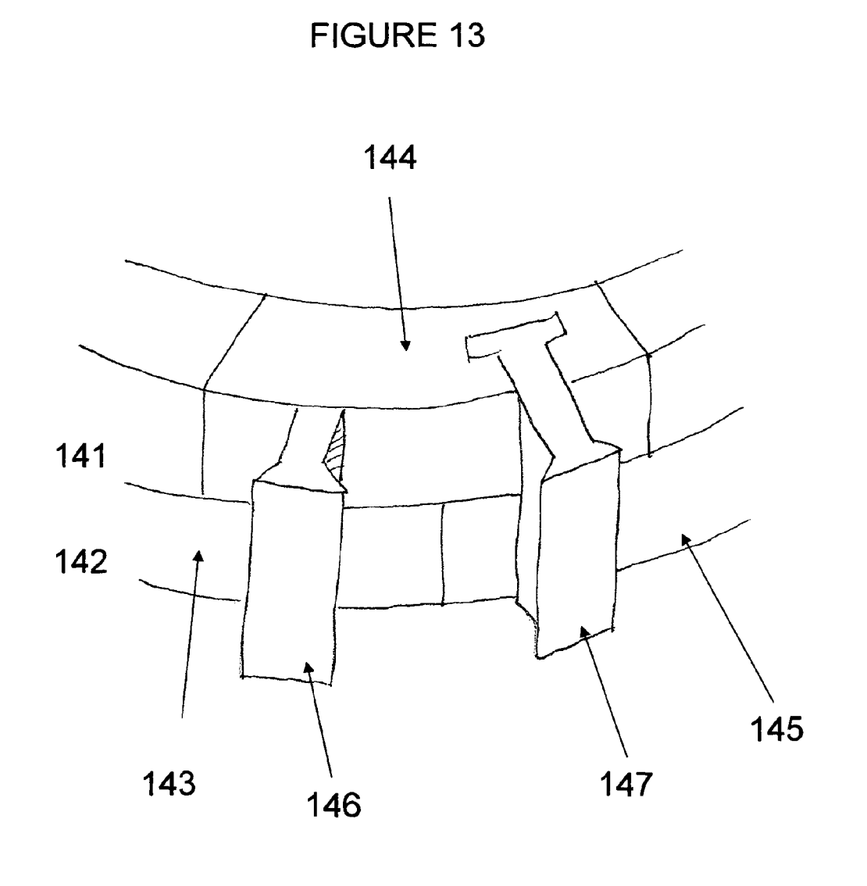
FIG. 13 shows a portion of a coil tooth assembly constructed from a number of support members.

When used to form a coil teeth assembly for engagement with another coil teeth assembly, as shown and described in relation to FIGS. 5A and 5B, it will be appreciated that the integral teeth of the support member extend in a direction perpendicular to the plane of the coil teeth assembly to allow engagement with a second coil teeth assembly. It is also preferred that the two complimentary coil teeth assemblies are aligned such that the joins between respective support members are offset against the joins between the support members in the adjacent coil teeth assembly. This is illustrated in FIG. 13 which shows part of a first coil teeth assembly (the upper ring) 141 engaged with part of a second coil teeth assembly (the lower ring) 142. Support member 144 forms part of upper coil teeth assembly 141 and is coupled to adjacent support members as described above (note that the coupling means is not shown). Support member 144 is also coupled to support members 143 and 145 from the lower coil teeth assembly because coil tooth 146, which is integral to member 144, is engaged with engagement means of member 143, and coil tooth 147, which is integral to member 145, is engaged with engagement means of member 144. It can be seen from FIG. 13 that the upper and lower coil teeth arrangements are offset relative to each other, such that the joins between adjacent support members do not align.

The support members are used to construct a coil teeth assembly of an electric motor or generator as described previously. The engagement means may comprise a plurality of slots for receiving individual teeth and the slots may have a portion that extends circumferentially within the support member, said portion extending past the circumferential position of one or both of the adjacent teeth. The support and teeth may be comprised of a series of laminations, which are preferably formed of electrical steel. The engagement means may have a tapering to guide the additional teeth during engagement, the tapering optionally being achieved by successive laminations having a different area. The coupling means may be located at either end of the main body and may comprise interlocking means. The interlocking means may comprise a protrusion for engagement with a slot, and a slot to receive a protrusion. The main body may comprise two or more portions offset with respect to each other in the direction perpendicular to the plane defined by the circumference of the coil tooth assembly to form a stepped arrangement.

Although rotors or stators embodying the present invention can be of any size, preferred sizes will depend upon the desired size of the electric motor or generator. For example, for an electric motor having an 18" diameter, the outside radius of the stator may be around 191 mm (i.e. the stator diameter is 382 mm). For a 20" diameter motor the outside diameter of the stator may be around 424 mm and for a 14" diameter motor the outside diameter may be around 339 mm. Therefore the support provided by the invention may have a diameter of between 300 mm and 500 mm. A preferred depth of the support would be between 40 and 60 mm, and preferrably around 50 mm.

A rotor or stator constructed according to any of the above embodiments finds particular utility in electric motors for electric vehicles. In particular, embodiments of the invention may be incorporated into road going electric vehicles and more specifically electric vehicles having one or more in-wheel electric motors.

The invention claimed is:

1. An electric motor or generator assembly comprising:
   a coil teeth assembly comprising a support, formed of laminations, and a plurality of teeth circumferentially distributed about the support for receiving wire windings, wherein the teeth are integrally formed with the support, and wherein the support comprises engagement structures formed between the teeth and arranged to receive an additional tooth having wire windings mounted thereon;
   the additional tooth having wire windings, wherein the tooth is engaged with the engagement structures of the coil teeth assembly;
   wherein at least one of the engagement structures of the coil teeth assembly or the tooth engaged with the engagement structures have a tapering to guide the tooth during engagement; and
   wherein the tapering is achieved by successive laminations with at least two of the laminations having different areas.

2. The electric motor or generator assembly according to claim 1, wherein the teeth integral to the support are formed of laminations.

3. The electric motor or generator assembly according to claim 1, wherein the engagement structures are arranged to receive individual teeth and restrict radial and circumferential movement of the individual teeth relative to the support.

4. The electric motor or generator assembly according to claim 1, wherein the engagement structures are located between adjacent teeth of the coil teeth assembly.

5. The electric motor or generator assembly according to claim 1, wherein the engagement structures comprise slots having a portion that extends circumferentially within the support wherein said portion extends past a circumferential position of one or both of the adjacent integral teeth.

6. The electric motor or generator assembly according to claim 1, wherein the support includes a plurality of support members arranged to be connected to form a support ring, each of the support members comprising an integral tooth and engagement structures.

7. The electric motor or generator assembly according to claim 1 further comprising a rotor or stator comprising the coil teeth assembly and a second coil teeth assembly comprising a second support, formed of laminations, and a second plurality of teeth circumferentially distributed about the second support for receiving wire windings, wherein the second plurality of teeth including the tooth are integrally formed with the second support, and wherein the second support comprises engagement structures formed between the second plurality of teeth, wherein the two coil teeth assemblies are mounted such that the integral teeth of one coil teeth assembly fit into the engagement structures of the other coil teeth assembly.

8. The electric motor or generator assembly according to claim 7, wherein an extension of the teeth along an axis through the center of one of the coil teeth assemblies and perpendicular to a plane of that coil teeth assembly is greater than an extension of the support along the same axis, and portions of the teeth extending beyond the support of the one coil teeth assembly are arranged to engage with the engagement structures of the other coil teeth assembly.

9. The electric motor or generator assembly according to claim 7, wherein each support includes a plurality of support members arranged to be connected to form a support ring, each of the support members comprising an integral tooth and engagement structures, wherein the two coil teeth assemblies are offset with respect to each other such that joins between respective support members of one of the coil teeth assemblies do not align with joins between respective support members of the other coil teeth assembly.

10. A support member for constructing an electric motor or generator assembly of an electric motor or generator according to claim 1 further comprising coupling structures for coupling the support member to one or more additional support members to form a coil teeth assembly.

11. An electric motor or generator assembly for an electric motor or generator comprising two or more support members according to claim 10.

12. A tooth for receiving wire windings for engagement with the engagement structures of an electric motor or generator assembly according to claim 1, wherein the tooth has a tapering thereon to assist in engagement with engagement structures and the tapering is achieved by successive laminations having different areas.

13. An electric vehicle having one or more in-wheel electric motors, comprising an electric motor or generator assembly according to claim 1.

14. An electric vehicle having one or more in-wheel electric motors, comprising a tooth according to claim 10.

15. A rotor or a stator for an electric motor or generator comprising two coil teeth assemblies, each according to claim 1, mounted such that the teeth of one coil teeth assembly fit into the engagement structure of the other coil teeth assembly.

16. The rotor or a stator according to claim 15, wherein an extension of the teeth along an axis through the center of one of the coil teeth assemblies and perpendicular to a plane of that coil teeth assembly is greater than an extension of the support along the same axis, and the portions of the teeth extending beyond the support are arranged to engage with the engagement means of the second coil teeth assembly.

17. The rotor or stator according to claim 15, wherein each support includes a plurality of support members arranged to be connected to form a support ring, each of the support members comprising an integral tooth and engagement means, wherein the two coil teeth assemblies are offset with respect to each other such that joins between respective support members of the first coil teeth assembly do not align with joins between respective support members of the second coil teeth assembly.

18. A coil teeth assembly for use in an electric motor or generator assembly, the coil teeth assembly comprising a support, formed laminations, and a plurality of teeth circumferentially distributed about the support for receiving wire windings, the teeth being integrally formed with the support; the support further comprising engagement structures, formed between the teeth, arranged to receive additional teeth having wire windings mounted thereon, wherein the engagement structures and/or the additional teeth have a tapering to guide the additional teeth during engagement, and the tapering is achieved by successive laminations with at least two of the laminations having different areas.

19. A method of making an element of a stator or a rotor for an electric motor or generator comprising:
providing a coil teeth assembly comprising a support, formed of a laminar material, and a plurality of teeth circumferentially distributed about the support for receiving wire windings, the teeth being integrally formed with the support; the support further comprising engagement structures, formed between the teeth, arranged to receive additional teeth having wire windings mounted thereon;
winding wire around the teeth of the coil teeth assembly
engaging the stator element with a plurality of individual teeth, or with a second coil teeth assembly having a second plurality of teeth, having wire wound thereon, wherein at least one of the engagement structures of the coil teeth assembly or the individual teeth or second plurality of teeth with which it is engaged have a tapering to guide the individual teeth or second plurality of teeth during engagement and the tapering is achieved by successive laminations with at least two laminations having a different area.

* * * * *